May 12, 1959 K. B. SORENSEN ET AL 2,886,113
CENTER DRIVE ROD WEEDER
Filed June 27, 1955 2 Sheets-Sheet 1

INVENTORS.
KNUD B. SORENSEN
BRIAN E. KENT
BY
ATTORNEYS

May 12, 1959 K. B. SORENSEN ET AL 2,886,113
CENTER DRIVE ROD WEEDER
Filed June 27, 1955 2 Sheets-Sheet 2

INVENTORS.
KNUD B. SORENSEN
BRIAN E. KENT
BY
ATTORNEYS

United States Patent Office

2,886,113
Patented May 12, 1959

2,886,113

CENTER DRIVE ROD WEEDER

Knud B. Sorensen, Rock Island, and Brian E. Kent, Moline, Ill., assignors, by mesne assignments, to Deere & Company, a corporation of Delaware Application June 27, 1955, Serial No. 518,114

6 Claims. (Cl. 172—39)

The present invention relates generally to agricultural implements and more particularly to a rotary rod weeder having new and improved means for clearing trash and the like away from the standards in the lower ends of which the rotary rod is journaled for rotation.

The object and general nature of the present invention is the provision of a rotary rod weeder in which the means for driving the rotary rod is enclosed along the sides and front and thereby protected from dirt, trash and the like, with means movable outside of but adjacent each standard for clearing trash, such as plant residue and the like away from the path of movement of the standard when the rod is drawn through the ground. More specifically, it is a feature of this invention to provide each standard of the rod weeder with a vertical trash clearing disk that is mounted for rotation on the standard and moved in a plane closely adjacent one side thereof, with means to drive the disk so that the forward portions move upwardly so as to carry trash and the like upwardly and away from the standard to an extent sufficient to permit the latter to pass through the trash without appreciable hindrance.

A further feature of this invention is the provision of new and improved driving means for such a trash clearing disk, which driving means extends into the interior of the standard, which carries means driving the rod, the disk driving means being operatively connected with the rod driving means within the standard.

A further feature of this invention is the provision of trash clearing means that is driven an appreciably greater rate than the rate of movement of the weeder rod driving means, whereby the trash and the like contacted by the trash clearing means is positively propelled out of the path of movement of the standard.

These and other objects and advantages of the present invention will be apparent to those skilled in the art after a description of the preferred structure in which the principles of the present invention have been incorporated, taken in conjunction with the accompanying drawings in which.

Figure 1:
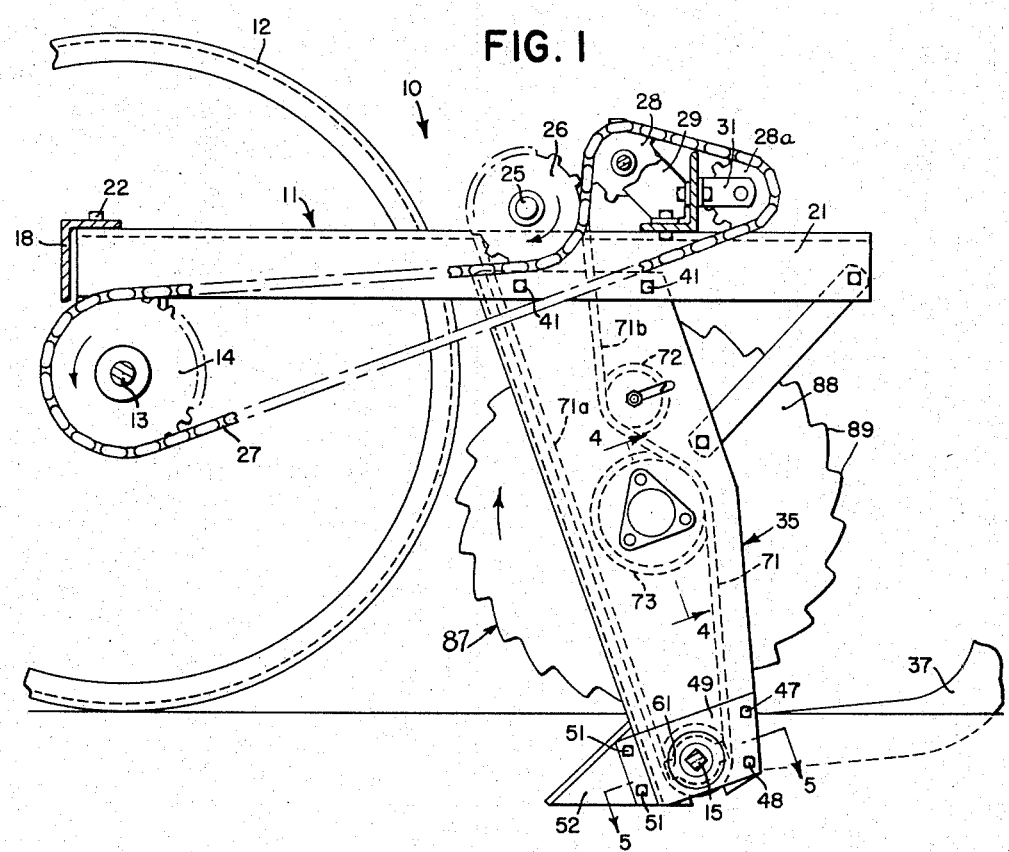
Fig. 1 is a side view of a portion of a rod weeder in which the principles of the present invention have been incorporated, certain parts of the rod weeder being shown in section.

Referring first to Fig. 1, the rod weeder, indicated in its entirety by the reference numeral 10, includes a main frame 11 supported on a pair of ground wheels 12, only one of which is shown in the drawings. The ground wheels 12 are fixed to a drive shaft 13 that extends transversely and is connected in any suitable way (not shown) with the forward portion of the main frame 11. The generally central portion of the shaft or axle 13 carries a drive sprocket 14 from which, through suitable means, a rotary weeder rod 15 is driven. The means fixing the wheels 12 to the shaft or axle 13 includes the usual ratchet mechanism by virtue of which the axle may overrun one of the wheels, as when making a turn.

Figure 2:
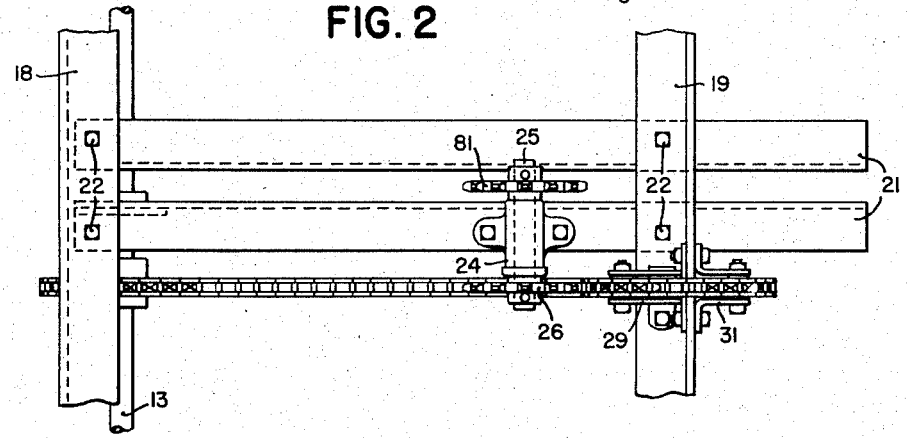
Fig. 2 is a top or plan view of the portion of the rod weeder shown in Fig. 1.

The rotary rod 15 is mounted for rotation in the lower ends of a plurality of standards, including two end standards and a central standard, as will be referred to in detail later. The main frame 11 includes front and rear sill angles 18 and 19 connected together by suitable end bars (not shown) and a centrally disposed pair of crossbars 21 arranged in closely spaced relation, as will best be seen in Fig. 2. Suitable means, such as bolts 22, fasten the crossbars 21 to the sill bars 18 and 19. Secured to one of the bars 21 is a bearing housing or journal box 24 in which a shaft 25 is rotatably disposed. A sprocket 26 is fixed to one end of the shaft 25 and is disposed in the plane of the sprocket 14 that is fixed to the axle shaft 13. A drive chain 27 is trained over the sprockets 14 and 26, and, as will be seen from Fig. 1, also over a pair of idler sprockets 28 and 28a that are carried, respectively, by brackets 29 and 31 fixed to the vertical flange of the rear sill angle 19. The idler sprocket 28 is so located on the frame 11 that the upper run or flight of the drive chain 27 passes around the lower portion of the sprocket 26 so that the shaft 25 is rotated in a direction opposite to the direction of rotation of the axle 13.

The rod 15, which normally operates just under the surface of the ground, is supported at its central part in a standard 35 and at its ends in conventional goose neck standards 37, the central standard 35 extending generally vertically and disposed in the generally central portion of the machine.

Figure 3:
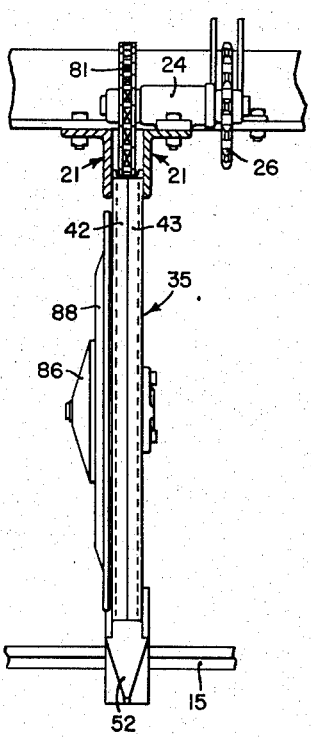
Fig. 3 is a forward view, looking rearwardly, of the portion of the rod weeder shown in Fig. 1, illustrating particularly the standard construction and the associated trash clearing disk, certain other portions shown in Fig. 1 being omitted for purposes of clarity.

The center standard 35, with which the present invention is more particularly concerned, comprises a pair of laterally spaced apart wall sections 38 and 39 secured, as by bolts 41, to the vertical flanges, which extend downwardly, on the adjacent portions of the angles 21, the latter angles being spaced apart a distance substantially equal to the laterally spaced apart wall sections 38 and 39. The latter along their front edges are provided with edge portions 42 and 43 that are turned toward one another and, when assembled, brought into substantially direct contact, as shown in Fig. 3, whereby the wall sections 38 and 39 provide an interior space, shown at 45 in Fig. 5, which is open rearwardly. The lower portions of the wall sections 38 and 39 are connected, as by bolts 47 and 48, to a pair of shoe supporting plates 49. The latter parts extend forwardly of the front edges of the plate sections 38 and 39 and are connected by a pair of bolts 51 (Fig. 1) to the forwardly disposed earth entering shoe 52.

Figure 5:
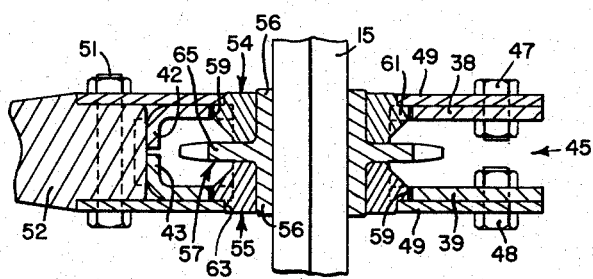
Fig. 5 is an enlarged sectional view, taken generally along the line 5—5 of Fig. 1.

The lower portions of the wall sections 38 and 39 are apertured to receive a pair of bearing members 54 and 55 that are apertured to receive the hub section 56 of a rod-driving sprocket pinion 57, the latter having two hub portions 56 to receive the two bearing members 54 and 55, as will best be seen from Fig. 5. In order to prevent the bearing members 54 and 55 from turning in the apertures formed in the lower portions of the side plates 38 and 39, the openings in the latter plates are provided with opposed notches 59 in which tongues 61 formed on the bearing members 54 and 55 are disposed. The plates 49 are provided with circular apertures 63 receiving the outermost portions of the hub members 54 and 56, the plates 49 thus being disposed at the outer sides of the tongues 59 so as to retain the members 54 and 55 against axial outward displacement. Axially inward displacement of the bearing members 54 and 55 is prevented by virtue of the contact between the axially inward portions of the bearing members and the adjacent portion 65 of the rod-driving pinion.

Figure 4:
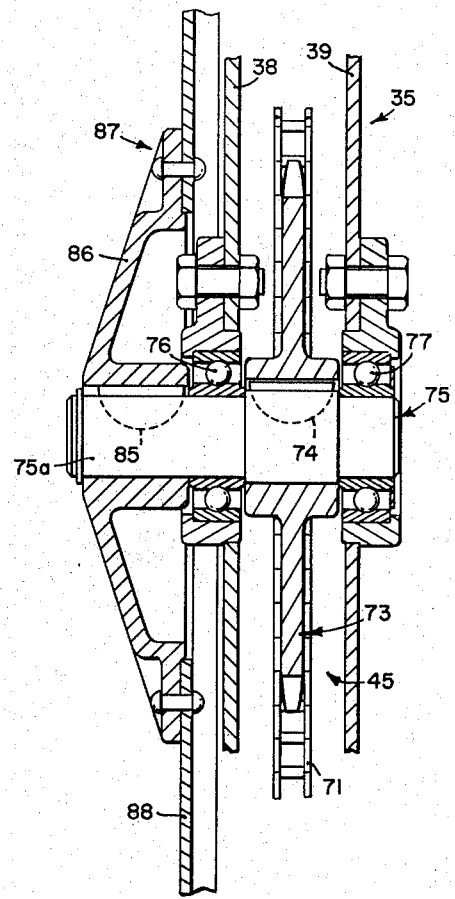
Fig. 4 is a sectional view taken generally along the line 4—4 of Fig. 1.

A sprocket chain 71 is trained over the sprocket pinion 65. The upwardly moving flight 71a of the chain is disposed in between the plate sections 38 and 39 and generally alongside the laterally turned marginal portions 42 and 43, and the rear flight 71b of the chain 71 passes over an idler 72 and over a sprocket 73 that is fixed, as by a key 74, with a shaft 75 that is journaled in a pair of bearing units 76 and 77 carried by the plate sections 38 and 39. The upper portion of the chain 71 is trained over a sprocket 81 fixed to the end of the shaft 25 opposite the sprocket 26. The central portion of the rear or downwardly moving flight 71b of the chain 71 is trained over the sprocket 73 that is fixed to the shaft 75 so that the shaft 75 is rotated by the same means that drives the weeder rod 15. One end 75a of the shaft 75 extends outwardly of the adjacent standard wall section 38 and is secured, as by a key 85, to the hub portion 86 of a trash clearing disk unit 87. The hub section 86 is so formed, as best shown in Fig. 4, that the disk section 88 is disposed in a vertical plane extending alongside the plate section 38 on the standard 17. The edge portions of the disk 88 are provided with teeth 89 that are shaped, as best shown in Fig. 1, so that when the disk is rotated in the direction of the arrow shown in Fig. 1, trash, crop residue and the like, lying on the ground in front of the standard 17, is pushed upwardly and away from the standard, thereby clearing a way for the latter as the machine is being drawn along the ground. It will also be noted from Fig. 1 that the teeth 89 are shaped in somewhat wedge-like formation and that the peripheral speed of the disk 88, particularly that of the teeth 89, is much greater than the rate of movement of the chain 71 that drives the sprocket 73. Thus, the relatively rapidly rotated disk, and more particularly the relatively rapidly upwardly moving teeth 89 of the disk, act to project the adjacent portions of trash or the like lying on the ground forwardly and away from the path of movement of the standard 35. Thus, the rapidly generally upwardly moving teeth 89 clear a path for the associated standard so that the latter is drawn along the ground through the surface trash but without likelihood of the latter accumulating or balling up under the frame of the rod weeder.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In a rod weeder, a generally vertical standard, a weeder rod journaled in the lower portion of said standard, a generally vertical trash clearing disk mounted for rotation on said standard in a position substantially against one side thereof and extending forwardly of the forward portion thereof, a common means for driving both said rod and said disk, and means enclosing said common drive means to prevent the contact of trash and the like therewith.

2. In a rod weeder, a generally vertical standard, including a pair of laterally spaced apart wall sections, a transverse shaft journaled in said sections and including a first portion disposed between said sections and a second portion extending laterally outside one of said sections, a trash clearing disk fixed to said shaft at the laterally outwardly extending end, and means disposed between said wall sections and connected with said first shaft portion for driving said disk.

3. A rotary rod weeder comprising a frame, a generally vertical standard secured at its upper end to said frame, a rotary rod journaled in the lower end of said standard, means within said standard to drive said rod, trash clearing means mounted on one side of said standard on the exterior thereof, and means extending into said standard from said one side thereof into driving connection with said rod driving means to drive said trash clearing means.

4. A rotary rod weeder as defined in claim 3, further characterized by said standard having laterally spaced apart wall sections, and said rod driving means comprising a chain having both upwardly and downwardly moving flights disposed between said wall sections, and said driving connection for said trash clearing means including a shaft extending transversely into said standard and having a driving connection with one of said chain flights.

5. The invention as set forth in claim 4, further characterized by said shaft extending outside said standard, said trash clearing means comprising a generally vertical disk, said shaft extending outwardly of one wall of said standard, and said disk being fixed to the outer end of said shaft in a position lying substantially against said one side of said standard and having a hub fixed to the outer side of said disk and connected with said shaft, the outer face of said hub having a smooth trash-clearing exterior.

6. In a rod weeder, a generally vertical standard, a weeder rod journaled in the lower portion of said standard, a generally vertical trash clearing disk mounted for rotation on said standard and mounted closely alongside the latter and of such diameter as to extend not only forwardly of the forward portion of the standard but also rearwardly of the rear portion thereof, sprocket chain means disposed within said standard and connected to drive said weeder rod, and means connected with said sprocket chain means for rotating said disk.

References Cited in the file of this patent

UNITED STATES PATENTS

| | | |
|---|---|---|
| 114,220 | Stone | Apr. 25, 1871 |
| 645,989 | Wilson | Mar. 27, 1900 |
| 2,355,229 | Miller | Aug. 8, 1944 |
| 2,398,385 | Mintken | Apr. 16, 1946 |
| 2,506,577 | Calkins | May 9, 1950 |